United States Patent
Lehnhardt et al.

(10) Patent No.: US 6,871,832 B2
(45) Date of Patent: Mar. 29, 2005

(54) FIBERGLASS, REINFORCED CONCRETE HOSE SHUT-OFF VALVE

(75) Inventors: Gary D. Lehnhardt, Cedar Grove, WI (US); Gordon W. Guslick, Grafton, WI (US); Rolando Altamirano, Grafton, WI (US); Gerald Biever, Port Washington, WI (US); James H. Larson, Cascade, WI (US)

(73) Assignee: Construction Forms, Inc., Port Washington, WI (US)

( * ) Notice: Subject to any disclaimer, the term of this patent is extended or adjusted under 35 U.S.C. 154(b) by 10 days.

(21) Appl. No.: 10/355,491

(22) Filed: Jan. 31, 2003

(65) Prior Publication Data

US 2004/0149942 A1 Aug. 5, 2004

(51) Int. Cl.[7] ............................................. F16K 7/04
(52) U.S. Cl. .......................................... 251/5; 137/557
(58) Field of Search ............................... 251/5; 137/557

(56) References Cited

U.S. PATENT DOCUMENTS

| 2,904,063 A | 9/1959 | Wall et al. | |
| 2,964,285 A | 12/1960 | Bardet | |
| 3,039,733 A | 6/1962 | Mattioli | |
| 3,286,726 A | * 11/1966 | Guy | 137/505.18 |
| 3,397,860 A | * 8/1968 | Bushmeyer | 251/61.1 |
| 3,643,912 A | * 2/1972 | Livingston | 251/5 |
| 4,899,783 A | 2/1990 | Yusko et al. | |
| 5,131,423 A | * 7/1992 | Shaw | 137/1 |
| 5,836,395 A | * 11/1998 | Budde | 166/321 |
| 6,102,361 A | * 8/2000 | Riikonen | 251/5 |

FOREIGN PATENT DOCUMENTS

| EP | 0008999 A1 | 3/1980 |
| EP | 1325994 A2 | 7/2003 |
| GB | 0620173 | 3/1949 |
| GB | 2023210 A | 12/1979 |

* cited by examiner

Primary Examiner—Edward K. Look
Assistant Examiner—John K. Fristoe, Jr.
(74) Attorney, Agent, or Firm—Andrus, Sceales, Starke & Sawall, LLP

(57) ABSTRACT

A shut off valve for use with a concrete delivery hose includes a single flexible cylindrical sleeve disposed within a one piece, continuous rigid casing that surrounds the hose. A gas chamber is defined between the sleeve and the casing so that when pressurized gas is forced into the chamber, the sleeve will be displaced radially inwardly to constrict the hose and stop the flow of concrete. The shut-off valve also includes a relief valve for quickly exhausting gas from the valve, and an off/on indicator for indicating open/closed positions of the valve.

3 Claims, 6 Drawing Sheets

FIBERGLASS, REINFORCED CONCRETE HOSE SHUT-OFF VALVE

FIELD OF THE INVENTION

The present invention relates to shut-off valves and more particularly to an inline valve to control the flow of concrete in a concrete delivery system.

BACKGROUND OF THE INVENTION

Typically, concrete is delivered at a job site to remote areas via a pump that pumps the concrete through a series of boom connected pipes terminating in a flexible delivery hose. The flow of concrete is typically controlled at a point remote from the delivery hose and thus even when the concrete flow is stopped at its source, it is not unusual for concrete to continue to flow or drip from the end of the delivery hose. This condition can be very undesirable at certain job sites.

One attempt to ameliorate this excessive flow condition is set forth in the current assignee's pending U.S. patent application Ser. No. 10/309,912 filed Dec. 4, 2002, which is herein incorporated by reference. In this application, a shut-off valve for use with a concrete delivery hose includes an outer rigid casing disposed around the concrete delivery hose as well as a first flexible sleeve within the casing. A second flexible sleeve is disposed within the first flexible sleeve so as to define a gas chamber between the two sleeves. A gas port extends through the casing and into the gas chamber so that pressurized gas can be introduced into the chamber causing the second sleeve to be forced radially inwardly to constrict and close the delivery hose.

While such shut-off valve has performed generally satisfactorily, it is desirable to provide an improved device with enhancements which will more immediately stop concrete discharge and eliminate spill and waste.

It is a principal object of the present invention to provide a concrete shut-off valve which is more efficiently and simply manufactured at a lower cost with a reduction in the number and machining of parts, a reduction in assembly time and the elimination of welding operations.

It is another object of the present invention to provide a concrete shut-off valve equipped with a relief valve and an off/on indicator.

It is an object of the present invention to provide a concrete shut-off valve that is easily installed and operated.

It is a further object of the present invention to provide a valve that is positioned on the outside of the delivery hose so that the valve is not in direct contact with the flow of the concrete.

It is still another object of the present invention to provide a valve that will reduce concrete spill over and/or drippage.

It is also an object of the present invention to provide a gas controlled shut-off valve.

It is an additional object of the present invention to provide various control for the shut-off valve.

BRIEF SUMMARY OF THE INVENTION

In accordance with one aspect of the invention, a shut-off valve for use with a concrete delivery hose includes a one piece, continuous, outer substantially rigid casing dimension to be disposed around the concrete hose. A single flexible sleeve is disposed within the casing and defines a gas chamber between the casing and the sleeve. A gas port extends through the casing and into the gas chamber whereby pressurized gas can be introduced into the chamber causing the sleeve to be forced radially inwardly to constrict and close upon the delivery hose. The single flexible sleeve has upper and lower ends which are folded over top and bottom ends of the rigid casing, an inner support ring disposed against an inside surface of the sleeve ends, an outer rigid support ring positioned against an outside surface of the folded over upper and lower ends of the sleeve, and fasteners being passed through the inner support rings, the folded over sleeve ends and the outer support rings to hold the casing, sleeve and inner and outer support rings together. The casing is preferably comprised of a fiberglass reinforced composite. The shut-off valve includes a relief valve connected to and in communication with the gas port for quickly exhausting gas delivered to the gas port. The shut-off valve further includes an off/on indicator connected to and in communication with the gas port for indicating open and closed positions of the shut-off valve. The off/on indicator includes a housing having an elongated passageway formed therein in communication with the gas port, the passageway having an inlet. A cylinder is fixed in the passageway and a valve element is disposed at one of the spring and normally biased by the spring to block the inlet. The valve element has an elongated plunger extending through the spring, the cylinder and the housing. The plunger has an indicating element on an end opposite the valve element, the indicating element being extendable and retractable relative to the housing depending on gas pressure in the gas port.

In another aspect of the invention, a shut-off valve for use with a concrete delivery hose includes an outer substantially rigid casing dimensioned to be disposed around the concrete delivery hose. Flexible sleeve structure is disposed within the casing and defines a gas chamber between the casing and the sleeve structure. A gas port extends through the casing and into the gas chamber whereby pressurized gas can be introduced into the chamber causing the sleeve structure to be forced radially inwardly to constrict and close upon the delivery hose. A relief valve is connected to and in communication with the gas port for quickly exhausting gas delivered to the gas port. An off/on indicator is connected to and in communication with the gas port for indicating open and closed positions of the shut-off valve. The casing on the sleeve structure defines a tubular cup assembly which is suspended upon the concrete delivery hose. The relief valve and the off/on indicator are located outside and alongside the cup assembly.

Various other features, objects, and advantages of the invention will be made apparent from the following detailed description and the drawings.

BRIEF DESCRIPTION OF THE DRAWINGS

The drawings illustrate the best mode currently contemplated of carrying out the invention.

In the drawings.

DETAILED DESCRIPTION OF THE INVENTION

FIGS. 1–4 show a shut-off valve as described in the aforementioned U.S. patent application Ser. No. 10/309,912 filed Dec. 4, 2002.

Figure 1:
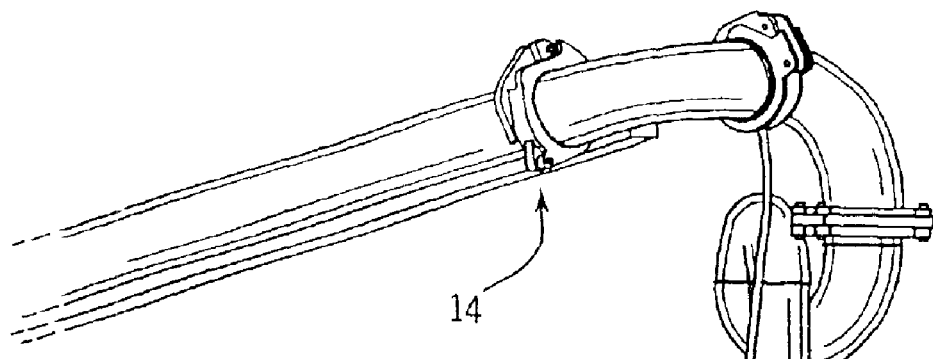
FIG. 1 is a perspective view of a shut-off valve connected to the delivery hose of a concrete pumping system.
Figure 1:
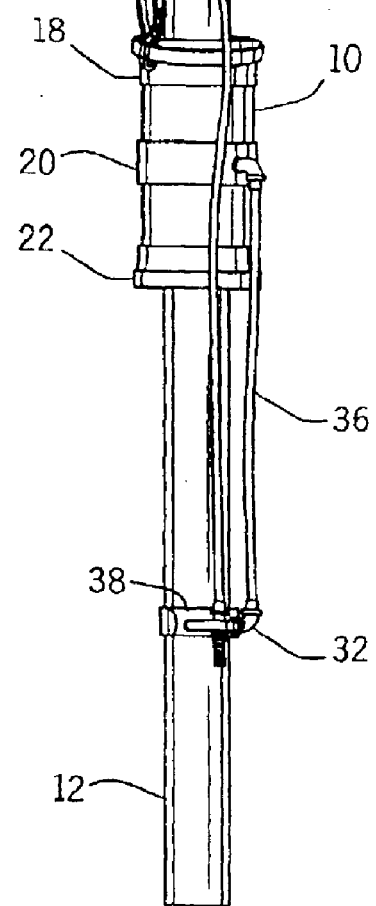

As seen in FIG. 1, a concrete control valve 10 is connected to and surrounds the concrete delivery hose 12 of a concrete pumping system 14. Control valve 10 includes an outer rigid casing 16 in the form of three steel bands 18, 20 and 22.

Figure 2:
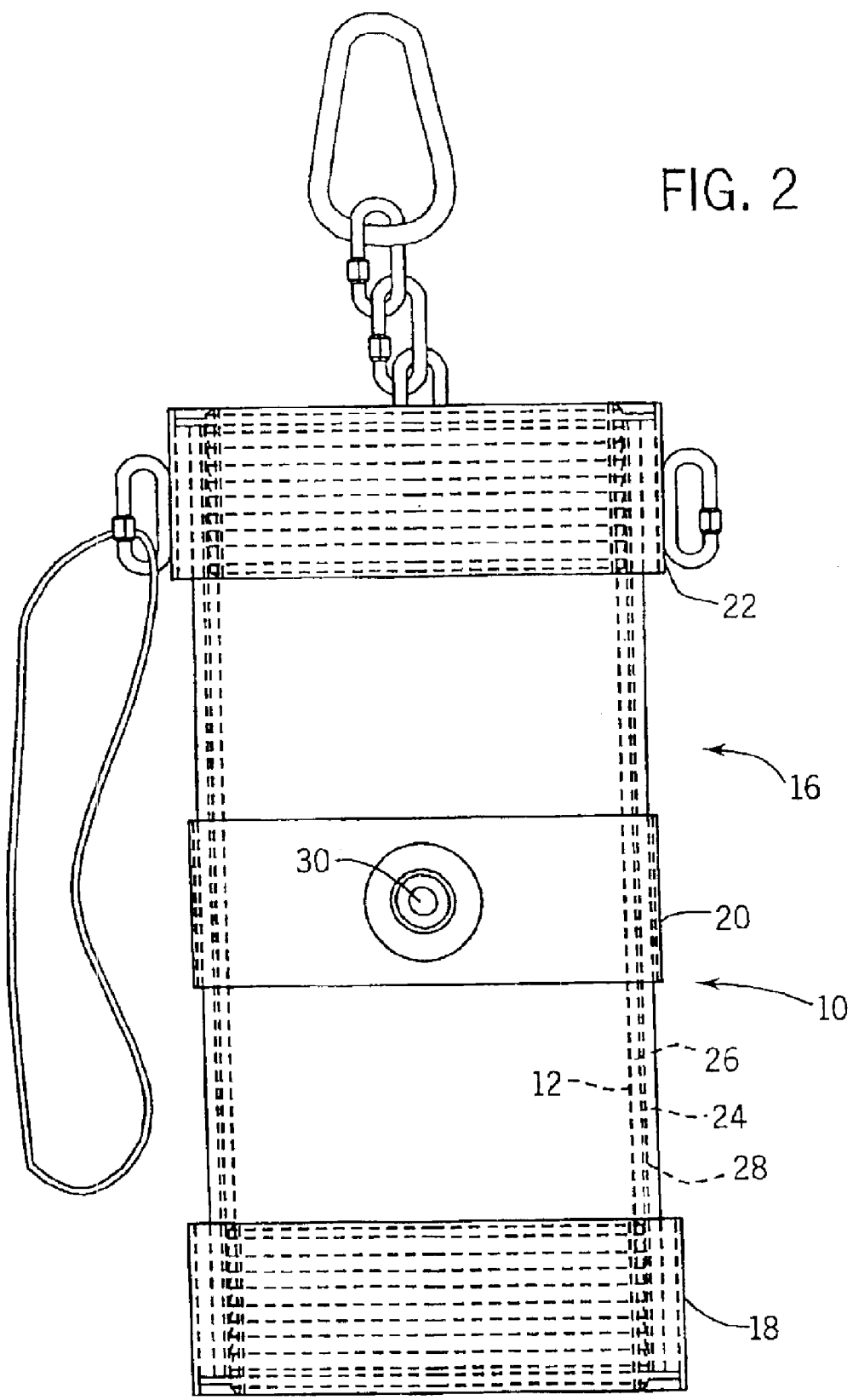
FIG. 2 is a side cross-sectional view of the valve of FIG. 1.
Figure 3:
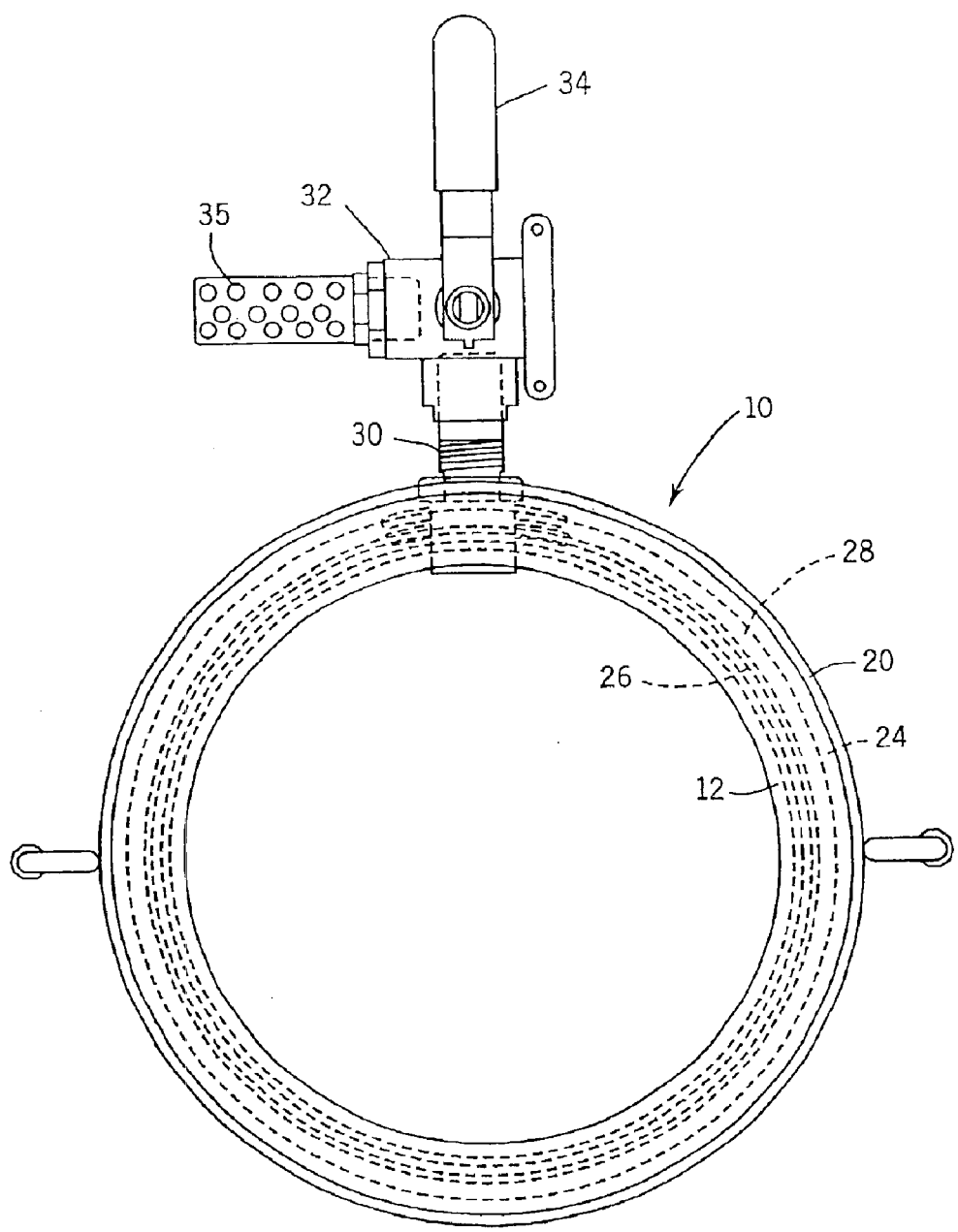
FIG. 3 is an end cross-sectional view of the valve of FIG. 2.

As seen in FIG. 2, first flexible rubber sleeve 24 is disposed in and connected to rigid casing 16. A second flexible rubber sleeve 26 is disposed radially inwardly of first sleeve 24 and defines a gas chamber 28 between first sleeve 24 and second sleeve 26. Together, the casing 16 and the sleeves 24, 26 form a tubular cuff assembly.

A gas port 30 (FIG. 3) is disposed on middle band 20 and extends through band 20 and first sleeve 24 so that it communicates with gas chamber 28. A gas flow control valve 32 with a manual control handle 34 and a muffler 35 is disposed on the outside of gas port 30. Gas line 36 (FIG. 1) channels a source of gas to control valve 32. Gas flow control valve 32 is retained in place around hose 12 by a strap 38. Gas flow control valve 32 is located beneath the concrete control valve 10.

In operation, pressurized gas such as air, nitrogen or the like is introduced into chamber 28 via flow valve 32 and gas port 30. First sleeve 24 is held in place by rigid casing 16 while second sleeve 26 expands radially inwardly to constrict delivery hose 12 to the point where the flow of concrete through delivery hose 12 is interrupted. When it is desired to resume the flow of concrete, the gas pressure is relieved so that second sleeve 26 can retract to its original position and delivery hose 12 will reopen.

Figure 4:
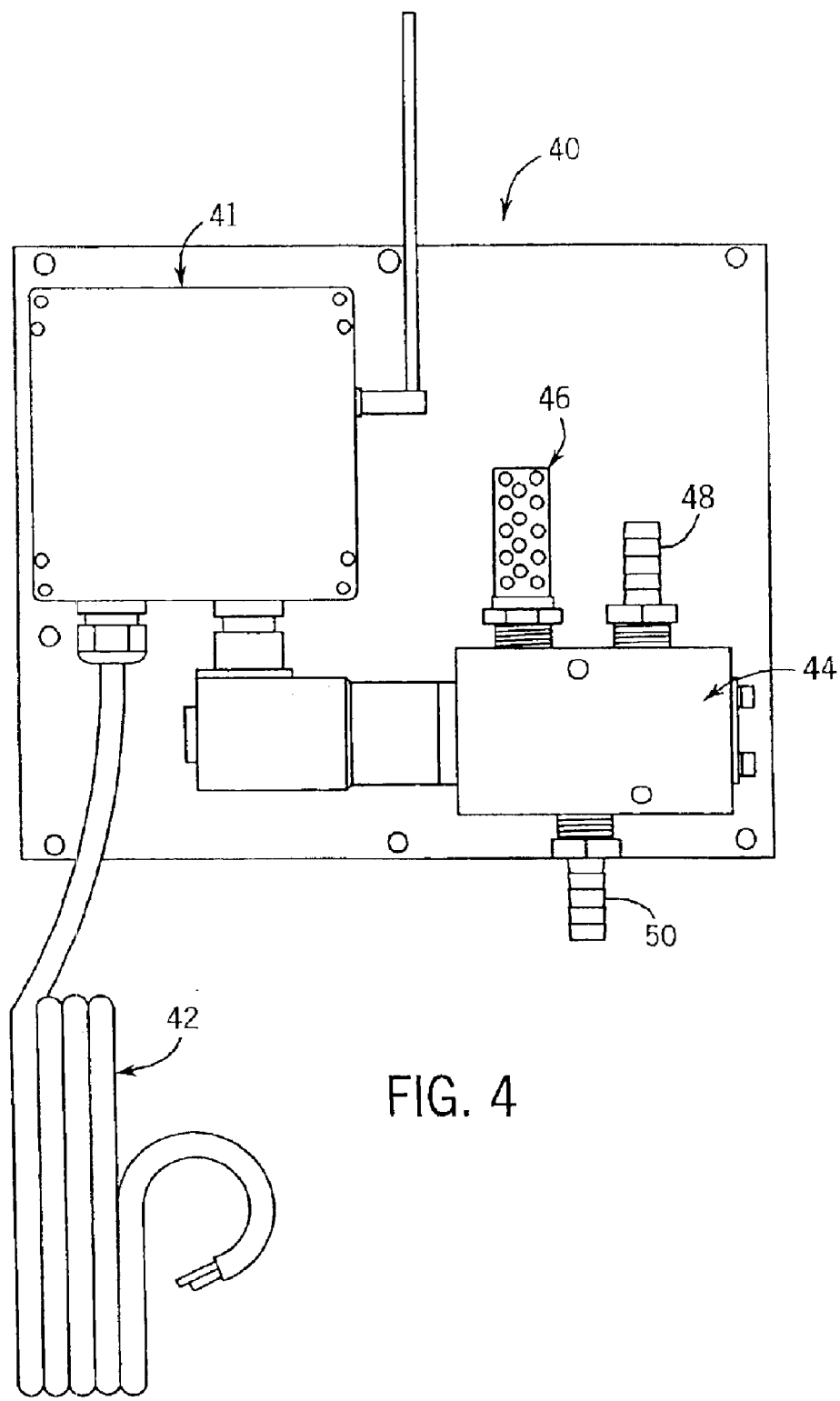
FIG. 4 is a representation of remote control for the valve of FIG. 1.

It should be understood that control valve 32 can either be hand operated with control handle 34 or interlocked with the control system of the pumping truck or controlled remotely as shown in FIG. 4. The remote control 40 includes a remote control box 41 connected to a cord 42 and joined to an air solenoid valve 44 having a muffler 46, a gas inlet 48 and a gas outlet 50. A separate remote control unit (not shown) triggers the solenoid valve 44.

Figure 5:
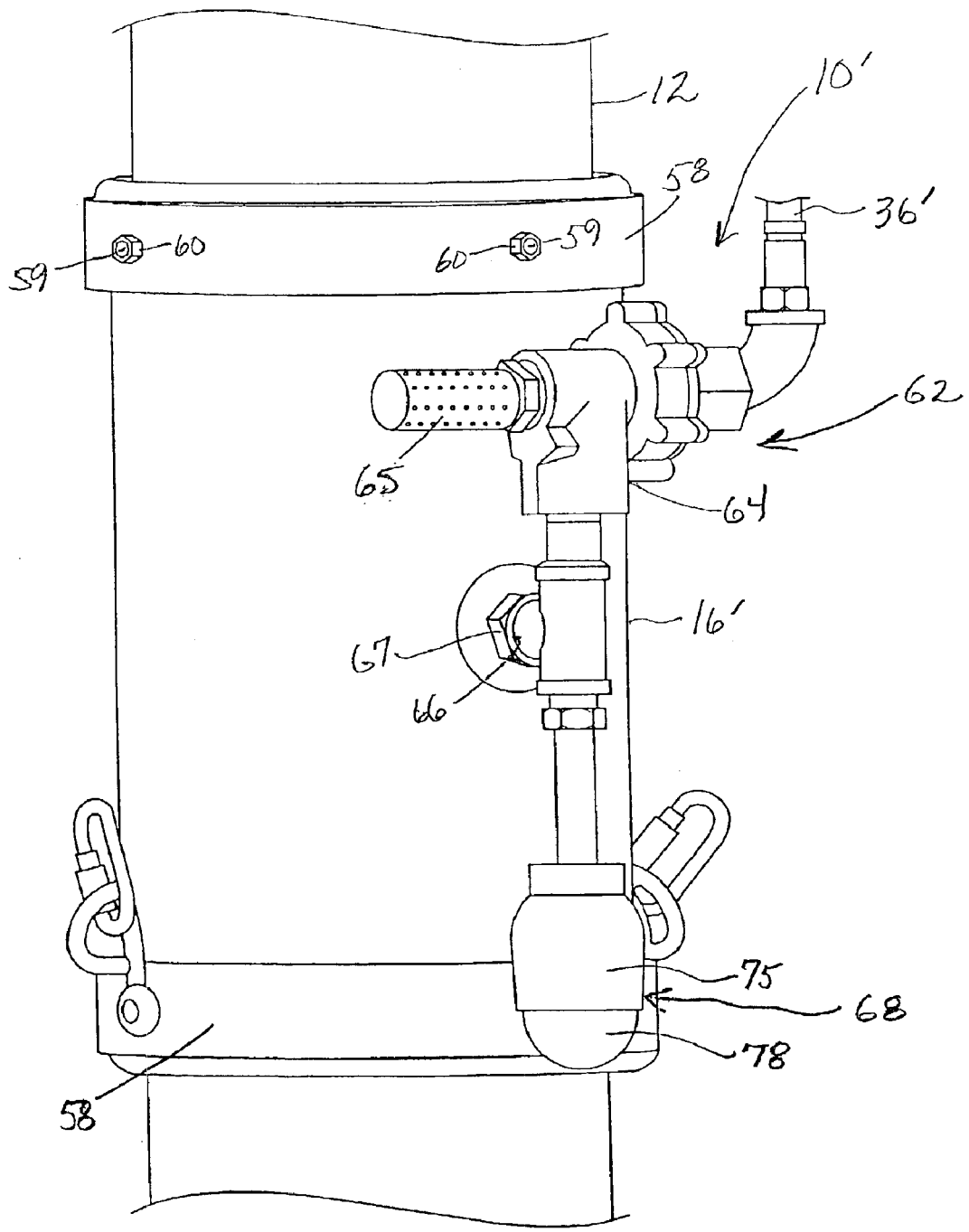
FIG. 5 is a perspective view of an alternative embodiment of the shut-off valve constructed according to the present invention.
Figure 6:
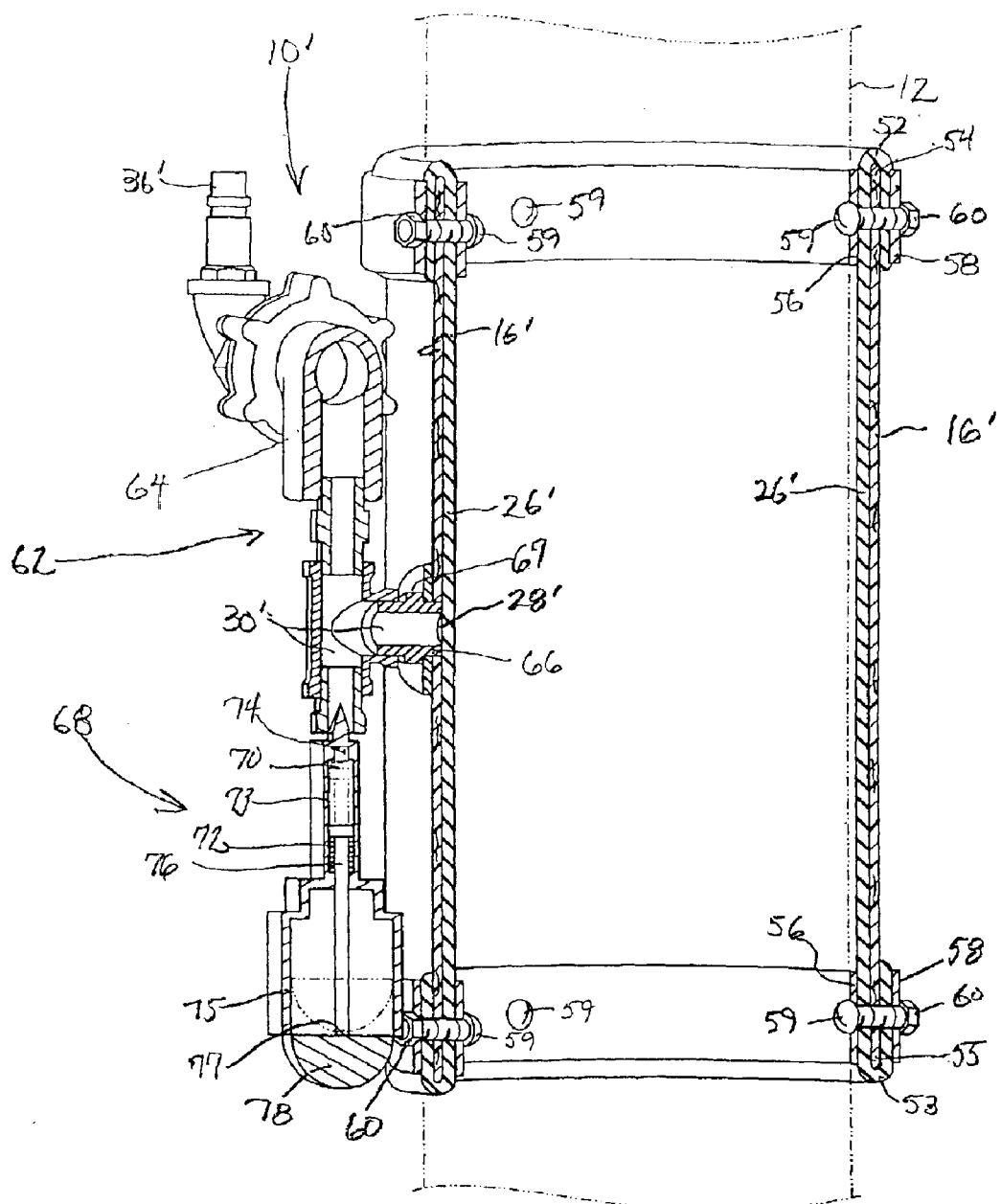
FIG. 6 is a break-away view of the shut-off valve shown in FIG. 5.

FIGS. 5 and 6 show an alternative embodiment according to the present invention which is similar to the principles and operations of the valve 10 shown in FIGS. 1 through 4 with the following exceptions and/or additions. Like numbers are used to denote like parts previously described.

In valve 10', the outer rigid casing 16' is provided by a single cylindrical shell formed of a fiberglass reinforced composite. Flexible rubber sleeve 26' is disposed radially inwardly of casing 16' and defines gas chamber 28' between casings 16' and rubber sleeve 26'. As seen at the extreme ends of the valve 10', the upper and lower ends 52, 53 of the rubber sleeve 26' are folded over top and bottom ends 54, 55 of the rigid casing 16'. An inner metal support ring 56 is placed to the inside of the sleeve 26', and an outer metal support ring 58 is positioned to the outside of the folded over portion of the sleeve 26'. A series of bolts 59 are passed through the inner support rings 56, the folded over sleeve ends 52, 53, the casing 16' and the outer support rings 58, and nuts 60 are attached to the shafts of the bolts 59 so as to hold the assembly tightly together without any welding.

An air intake/exhaust system 62 is comprised of a gas port 30' in communication with a relief valve 64 and a gas line 36'. Relief valve 64 is equipped with a muffler 65 as seen in FIG. 5. Gas port 30' is attached, such as by drilling and tapping a hole in the shell 16, and screwing a bushing 66 with threads into the tapped hole until the brushing 66 is secure. Once this is completed, a lock nut 67 is tightened on the bushing 66 to prevent the gas port 30' from coming loose. Gas port 30' extends through the casing 16' so that it communicates with gas chamber 28'. Gas line 36' channels a source of gas to gas chamber 28', the flow of gas being controlled manually or by remote control as previously described.

Attached to a lower portion of the gas port 30' is a pressure sensitive off/on indicator 68 which is in communication with the gas being selectively supplied to the gas port 30'. The off/on indicator 68 includes a moveable valve element 70 which is normally biased upwardly by a compression spring 72 disposed in a cylinder 73 fixed in a passageway 74 to prevent gas from entering passageway 74 in communication with a cup-like housing 75. The valve element 70 has a depending elongated plunger 76 which passes through the compression spring 72, the cylinder 73 and the housing 75, and has an opposite end 77 attached to a dome-like, preferably colored, indicating element 78 which extends and retracts relative to housing 75 depending on the pressure of gas delivered to the gas port 30'.

It should be understood that the off/on indicator 68 may take other forms. For instance, one could employ a battery-operated light or sound device which is activated by gas pressure to accomplish the same concept as described above.

In operation, pressurized gas, such as air, is delivered through air intake/exhaust system 62 into gas chamber 28' via gas port 30'. Rubber sleeve 26' expands radially inwardly to constrict delivery hose 12 to the point where flow of concrete through hose 12 is interrupted. At the same time, gas pressure in the passageway 74 will act to unseat valve element 70 against the bias of spring 72 and move plunger 76 so that the indicating element 78 will extend away from the housing 75 to give visual indication to the operator that the shut-off valve 10' is closed upon the hose 12. When it is desired to open the shut-off valve 10', delivery of gas to gas line 36' is stopped and pressurized gas is exhausted quickly through the relief valve 64 and muffler 65. As this happens, the spring 72 will move the valve element 70 to block passageway 74 so that the plunger 76 and indicating element 78 will retract inside housing 75 (as shown in phantom lines of FIG. 6) to indicate to the operator that the valve 10' is open whereupon concrete may again flow freely through hose 12.

It should be understood that the shut-off valve 10' operates in a more efficient manner to more quickly exhaust gas due to the inclusion of the relief valve 64 which enables a reduction of about 50 percent (from eight seconds to four seconds) in the opening/closing time of the valve 10'. This improvement in reaction time is conveniently transmitted visually to the operator via the pressure responsive off/on indicator 68. It should be further appreciated that the present invention involves a reduction in the machining and number of components, a reduction in assembly time and the elimination of welding, all of which contribute to lower cost with an improved response.

It is recognized that other equivalents, alternatives, and modifications aside from those expressly stated, are possible and within the scope of the appended claims.

We claim:

1. A two position, concrete flow leakage preventing shut-off valve adjustably mounted on a concrete delivery hose, whereby the flow of concrete through the hose can be controlled solely between an open concrete flow condition and a closed concrete flow condition, the valve comprising:

an outer substantially rigid casing dimensioned to be disposed completely around the concrete delivery hose;

flexible sleeve structure disposed within the casing along an entire inner surface thereof and defining a gas chamber between the casing and the sleeve structure, the concrete delivery hose passing entirely and continuously through the casing and the sleeve and isolating the concrete flow from the casing and the sleeve;

a gas port extending through the casing and into the gas chamber whereby pressurized gas can be introduced into the chamber causing the sleeve structure to be forced radially inwardly to constrict and close upon the concrete delivery hose to define the closed concrete flow condition wherein concrete flow from an outlet end of the concrete delivery hose is terminated, and whereby pressurized gas can be exhausted from the chamber by a relief valve connected to and in communication with the gas port for quickly exhausting gas delivered to the gas port causing the sleeve to open upon the concrete delivery hose to define the open concrete flow condition; and an off/on indicator connected to and in communication with the gas port for indicating open and closed concrete flow conditions of the shut-off valve, wherein the casing and the sleeve structure define a tubular cuff assembly which is adjustably suspended upon the concrete delivery hose.

2. The shut-off valve of claim 1, wherein the relief valve and the off/on indicator are located outside and alongside the cuff assembly.

3. The shut-off valve of claim 2, wherein the off on indicator includes a housing having an elongated passageway formed thereon in communication with the gas port, the passageway having an inlet, a cylinder fixed in the passageway, a compression spring positioned in the cylinder, a moveable valve element disposed at one end of the spring and normally biased by the spring to block the inlet, the valve element having an elongated plunger extending through the spring, the cylinder and the housing, the plunger having an indicating element on an end opposite the valve element, the indicating element being extendable and retractable relative to the housing depending on gas pressure in the gas port.

* * * * *